United States Patent Office 3,729,326
Patented Apr. 24, 1973

3,729,326
CHEESE FLAVOR
Robert L. Kasik, Chicago, Ill., assignor to Beatrice
Foods Co., Chicago, Ill.
No Drawing. Filed Feb. 16, 1971, Ser. No. 115,751
Int. Cl. A23c 19/02; A23l 1/26
U.S. Cl. 99—140 R                  41 Claims

ABSTRACT OF THE DISCLOSURE

A cheese flavor is produced by growing an Acetobacter organism and a lactic acid producing Streptococcus organism in a fluid medium containing a protein and carbohydrate. Growth is carried out for at least five hours at 60° to 130° F.

The present invention relates to the production of a cheese flavor and to products flavored therewith. The growing use of cheese flavors for flavoring various foods has created a large demand for cheese flavors. While cheese flavors can be produced by dispersing naturally produced cheese in a liquid medium and spray drying the dispersed natural cheese to a powder, this process is relatively expensive, owing to the initial expense of the naturally produced cheese. However, the intended purpose for the cheese flavor is often that of an inexpensive food, such as dips, sauces, soups, snack foods and the like. Under the circumstances, with natural cheese being the raw material for the cheese flavor, it has been necessary to exceedingly limit the amount of cheese flavors placed in these relatively inexpensive foods. As a result thereof, these foods have a minimum cheese flavor and this minimum cheese flavor is substantially undetected by many of the consuming public.

Accordingly, the art has sought processes for producing cheese flavors, which processes produce the cheese flavors at a cost substantially below that of the process using natural cheese. While there has been significant success in these efforts, many of the flavors produced not only have unwanted off-flavors, but do not contain the entire flavor range of naturally produced cheese. In this regard, obtaining a "cheesy" background flavor in the artificially manufactured flavors has been particularly troublesome. In other words, these processes have been able to produce the overriding specific cheese taste of various cheeses, e.g., cheddar cheese, Italian cheese, bleu cheese and the like, but these processes have suffered from deficiencies in the basic cheesy background flavor, which is common to all naturally produced cheeses. While this deficiency is not of significant importance for many applications of the cheese flavors, the cheesy background flavor is most important for other applications. Hence, when the cheese flavors were mixed with some other food ingredients, such as dairy products and oils, to produce a cheese flavored composition, these other ingredients of the composition functioned to provide a weak reminiscence of the natural cheesy background flavor. However, when these cheese flavors are placed in other compositions, notably snack foods based on cereals and grains, even this weak reminiscence of a cheese background flavor is distinctively missing.

In co-pending U.S. application filed on behalf of Robert L. Kasik and Anthony J. Luksas, on May 23, 1969, Ser. No. 824,250, now U.S. Patent 3,674,508, assigned to the present assignee, there is disclosed a process for producing a cheesy background flavor for use in cheese flavored foods. The cheesy background flavors of that invention are produced by growing specific organisms in a specific medium and the flavors are suitable for incorporation into cheese flavored compositions, especially those containing dairy products or oils. Also, the cheesy background flavors produced according to that invention can be compounded with natural cheese to act as an intensifier for the natural cheese, hence allowing the use of smaller amounts of the natural cheese to produce a satisfactory product.

The organisms utilized to produce the cheesy background flavor as disclosed in the aforementioned application, are combinations of non-toxic members of the genus Bacillus and the genus Streptococcus. The present invention departs from the invention disclosed in the aforementioned application in two major respects. Firstly, the organisms to be used with the present invention are from the genus Acetobacter and from the genus Streptococcus and the process may be carried out under conditions of from microaerophilic to aerobic. Secondly, the basic cheesy background flavor is more intense than that of the said application and can, therefore, provide the required background flavor in smaller concentrations.

While any non-toxic member of the genus Acetobacter may be used with the present invention, the process must be carried out in the presence of a non-toxic lactic acid producing organism from the genus Streptococcus. Hence, the present process requires that at least one non-toxic member of the genus Acetobacter be grown in the presence of at least one non-toxic lactic acid producing Streptococcus organism. While the ratio of the organisms from the genus Acetobacter to that of the organism from the genus Streptococcus may vary widely, it is preferred that ratios between 20:80 to 80:20 respectively, be used for best results.

The organisms are grown in a fluid medium with agitation and aeration for a time sufficient to develop the desired intensity of the cheesy background flavor. The specific time required to accomplish reasonable degrees of flavor development will vary somewhat depending upon the amount of agitation and aeration, as well as the temperature under which growth takes place. Additionally, the required growth period will vary somewhat depending upon the specific concentrations of growth substances in the growth medium. Nevertheless, for most applications of the present process, growth times as short as 5 hours will produce a significant amount of flavor, although growth times of at least 15 hours are preferred. There is essentially no upper limit on the amount of time that the organism may be allowed to grow, but the rate of growth, under most conditions, drop off rapidly after about 2 to 5 days, and little growth of the organisms takes place thereafter. Nevertheless, if one desires, the growth could be continued for a month or more, e.g. two to five months, although no advantage is obtained with these longer growth periods.

The medium for the growing of the organisms may be the same as that disclosed in the aforediscussed U.S. application Ser. No. 824,250. Hence, the medium is a fluid medium containing a protein and a carbohydrate. The proteins which may be utilized by the organisms are not critical and may be, for example, animal proteins, e.g. milk and milk products, or vegetable proteins, e.g. soybean protein and like vegetable proteins. The organisms are non-sensitive to the particular protein and carbohydrates. Like-wise, the particular percentages of protein and carbohydrate in the fluid medium are not critical, but from 0.5 gram of protein per 100 grams of fluid medium and from 0.5 gram of carbohydrates per 100 grams of fluid medium to 35 grams of protein and 35 grams of carbohydrate per 100 grams of fluid medium are suitable, especially 1 gram of protein and 1 gram of carbohydrate to 7.5 grams of protein and 5.5 grams of carbohydrate.

As can be easily recognized from the above discussion of suitable fluid mediums for growing the organisms, milk itself provides a suitable medium containing the required proteins and carbohydrates in the above ranges. However, instead of milk, milk fractions or other milk products may be used, for example, cream, whole milk, skim milk, milk solids (total milk solids or non-fat milk solids and like fractions or products). Alternately, the fluid medium may be simply a dispersion of an animal or vegetable protein and a convenient carbohydrate in a water suspension. Hence, the protein source could simply be a bland whey, optionally with additional carbohydrates added thereto, if the particular content of carbohydrate in the bland whey is less than that indicated above.

The temperature during which the growth takes place is not narrowly critical and can vary over a considerable range. For example, the temperature may be as low as 60° F. or lower and as high as 120° F. or higher, e.g. 55° F. to 130° F., but the higher and lower temperatures only render the process more difficult to carry out. Under the circumstances, it is preferred that temperatures between room temperatures and 110° F. be used, especially between 85° and 100° F. The preferred temperature is approximately 92° F.

As noted above, the growth of the organisms in the fluid medium must be under conditions from microaerophilic to aerobic conditions and the process must not allow the organisms to grow under anaerobic conditions. One skilled in the art can easily determine when conditions from microaerophilic to aerobic conditions exist, but these conditions can be easily accomplished merely by aerating and stirring during the growth period in a conventional manner. Conveniently, the growth is carried out in a closed container with the head space of that container being continually flush with the sterilized air, while the fluid medium is being aerated. This will insure conditions with more dissolved oxygen than microaerophilic conditions and will prevent contamination of the growth medium during the growth period. However, after an initial mixing period, the container may be capped and growth may be obtained for the required period, e.g. 5 or 7 days, in the capped container. This will establish, essentially, microaerophilic conditions.

In connection with the Acetobacter organism used in the present invention, those skilled in the art will immediately recognize that members of the genus Acetobacter are not normally considered organisms which will grow on a medium of the present nature, e.g. milk. Acetobactor organisms, of course, are the organisms normally used in the production of vinegar from fruits and the like and are not normally associated with growth in a milk or milk-like medium. However, Acetobacter organisms can be trained to grow in a milk or milk-like medium of the present nature and this is one of the bases of the present invention. The training of the Acetobacter organisms is carried out in a conventional manner. Accordingly, the Acetobacter is placed in milk or milk-like medium as defined hereinbefore, and allowed to incubate under conditions heretobefore defined for a relatively short period, e.g. one day to a week or two weeks. Thereafter, a portion of the growth product, although the amount of organism growth is very small, is transferred to a fresh medium of the same nature. Again, after a growth period, a portion of the growth product, again very little growth has taken place, is transferred to another fresh growth medium. This process is repeated until the Acetobacter organisms have been trained to grow on the medium of the present nature. At least three transfers are generally required, e.g. at least four to ten transfers, before the Acetobacter have been sufficiently trained to grow on a medium of the present nature. Nevertheless, one skilled in the art can easily determine when the training has advanced to a sufficient stage, since at that point, the Acetobacter will begin to grow very rapidly on the medium. It is additionally advantageous to train the Acetobacter to grow on the present medium in the presence of the Streptococcus organism used in the present process. It should be noted, however, that some growth of the Acetobacter organisms will take place without the training thereof and some results of the present invention can be obtained without training the Acetobacter organisms, although the process is considerably slowed down and the flavor intensity is considerably reduced. Nevertheless, it is possible to obtain some of the benefits of the present invention without training the Acetobacter organisms.

As noted above, an important feature of the present invention is the increased intensity of the cheese background flavor produced. It is also a feature of this invention that the product produced by the present process may be combined with the products produced according to the invention in co-pending application Ser. No. 824,250. Accordingly, the disclosure of that application is hereby incorporated by reference. The product of the present process and the product of the said co-pending application may simply be combined after the growth processes of the respective inventions have been accomplished. Hence, the growth products of the said co-pending application, still in the liquid state, may be combined with the growth product of the present invention, still in the liquid state. Thereafer, the combined growth products may be dried, e.g. spray dried in the conventional manner, to produce a powdered cheese flavor. Alternately, the respective growth products in the liquid state may be simply combined and pasteurized to produce a liquid cheese flavor. Further, the respective growth products may be combined, and after being pasteurized, they may be concentrated to produce a concentrated liquid cheese flavor.

The combination of the growth product of the said co-pending application and the present invention provides a total cheese background flavor which is superior to the flavors of the products produced by the respective processes. This, in effect, provides a synergistic result between the growth products of the two inventions, and is an important feature of the present invention.

Yet another embodiment of the combination of the growth product of the two processes may be accomplished in the following manner. After growing the organism of the process of said copending application, the vessel used for carrying out the growth process may be simply opened up and the present different organisms placed in that growth product either with or without pasteurization or sterilization thereof. Thereafter, additional growth of the organisms is allowed to take place under conditions from microaerophilic to aerobic, e.g. with agitation and stirring. Hence, in effect, the growth product of the said application is used as a growth medium for the present organisms. At the end of the further growth period, the liquid product may be condensed or dried as noted above to produce background cheese flavors, and the same synergistic effect is obtained.

However, it is preferred, for obvious reasons, to carry out the growth of the respective organisms, i.e. Acetobacter/Streptococcus and Bacillus/Streptococcus in the same medium at the same time. This allows only one growth operation to produce the combined background flavors of the inventions and provides the synergistic effect noted above. This procedure is, therefore, a preferred embodiment of the invention. However, when growth of the respective combinations of organisms is carried out at the same time in the same medium, the Streptococcus organism may simply be a lactic acid producing organism and that organism can function as the Streptococcus organism for both combinations of the respective processes. In effect, therefore, the combination of organisms in the combined process would be Bacillus/Acetobacter/Lactic acid producing Streptococcus. In this combined process, the growth medium and growth conditions are the same as noted above and the only essential difference being that all of the organism growths take place in one medium at the same time.

The aforesaid co-pending application is referenced for a detailed disclosure and discussion of the process disclosed therein, but briefly stated, that process is directed to producing a cheese background flavor by sterilizing an aqueous medium containing a protein and carbohydrate, a growth medium as used herein and as disclosed above, inoculating that medium with at least one non-toxic organism of the genus Bacillus and at least one non-toxic organism of the genus Streptococcus and allowing the organisms to grow. Generally, the ratio of organisms of the genus Bacillus to the organisms of the genus Streptococcus is between 25:75 to 75:25 respectively, and the growth process is carried out under at least microaerophilic conditions at temperatures between 50° F. and 130° F. for about 3 days or more. The product produced by the process is an aqueous medium having protein and carbohydrates therein and a proliferation of non-toxic organisms of the genus Bacillus and the genus Streptococcus and the growth products thereof. As noted above, this product produced by the process of the said application is combined in the above-described manner with the growth product of the present invention to provide very satisfactory cheese background flavors.

The present invention will be illustrated by the following examples, but it is to be understood that the invention is not limited to the examples but is fully applicable to the breadth of the foregoing disclosure.

EXAMPLE 1

Into a conventional fermenter is placed 100 gallons of 10% by weight of dry milk solids reconstituted in water. The reconstituted milk solids are heated to 185° F. for at least 30 minutes to pasteurize the reconstituted milk and reduce the number of viable competitive organisms. The reconstituted milk is then cooled to about 92° F. and inoculated with a 1% by volume of a culture which was 50% by count *Acetobacter aceti* and 50% by count of *Stroptococcus lactis* which have been trained to grow in the reconstituted milk medium. The inoculated medium is maintained at a temperature of about 90° F. and the medium is stirred and aerated in a conventional manner substantially throughout the growth period. To insure aeration, the head space of the fermenter is substantially continuously flush with sterilized air at a rate of about 0.5 cubic feet of air per minute. After about 24 hours of growth period, the growth product is heated to about 145° F. and 30 minutes to substantially kill all of the organisms therein. The product is then cooled to room temperature and a liquid cheese background flavor is produced. This liquid cheese flavor is suitable for direct incorporation into food products to provide a cheese background flavor thereto.

EXAMPLE 2

The growth product of Example 1 is spray dried in a conventional spray drier under conventional conditions. The powdered product obtained has an intense cheese background flavor and is quite suitable for flavoring food products.

EXAMPLE 3

The growth product of Example 1 is mixed with the liquid growth product produced according to the process disclosed in co-pending application Ser. No. 824,250 in equal volume ratios. The resulting mixture has superior cheese background flavor, as compared with the growth products of the said co-pending application and of Example 1.

EXAMPLE 4

The product of Example 3 is concentrated by vacuum drying to a volume content approximately 50% of that of the initial mixture. The resulting liquid concentrate has an intense cheese background flavor.

EXAMPLE 5

The product of Example 3 is spray dried in a conventional manner and the powder produced has an intense cheese background flavor.

EXAMPLE 6

The product of Example 1 is mixed with 2% sodium chloride, 0.1% FDA Yellow No. 5 and 0.1% Yellow No. 6 (all by weight) and homogenized at 1500/500 p.s.i.g. in a two-stage Matin-Gaulin piston homogenizer and then spray dried at conventional conditions. The resulting powder is dispersed in oil and provides an intense cheese background flavored oil.

This flavored oil is mixed in equal weight proportions with natural cheddar cheese and this mixture is then used in a conventional extruder which produces a cereal snack food with a cheese flavor. The mixture is incorporated into the cereal during its passage through the extruder and the extruder cereal product has a mild but full-flavored cheddar cheese taste.

EXAMPLE 7

A process is carried out according to Example 2 of co-pending application Ser. No. 824,250. After opening the head space of the fermenter used to carry out that process, the growth product was pasteurized at 145° F. for 30 minutes. Thereafter, the inoculant of present Example 1 was placed in the fermenter and the inoculated medium was agitated and aerated, with sterilized air being passed through the head space at a rate of 0.5 cubic feet of air per minute. The growth was continued for 24 hours, after which the growth product was again pasteurized at 145° F. for 30 minutes.

Thereafter, the following ingredients were added to the resulting growth product: 2% by weight of sodium chloride, 0.01% FDA Yellow No. 5 and 0.10% Yellow No. 6. The mixture was then homogenized at 1500/500 p.s.i.g. in a two-stage Matin-Gaulin piston homogenizer and dried in a conventional manner. The resulting powder had an intense cheese flavor.

EXAMPLE 8

The procedure of Example 1 was repeated except that the reconstituted milk, after cooling, was inoculated with 1% by volume of a culture which was 25% by count *Acetobacter aceti*, 25% by count of equal proportions of *Bacillus megaterium* and *Bacillus megatherium* and 50% by count of equal proportions of *Streptococcus lactis* variation *diacetilactis* (citrate fermenter) and *Streptococcus lactis* variation *diacetilactis* (citrate non-fermenter). The resulting growth product after completion of the procedure of Example 1 was spray dried under conventional conditions to produce an intense cheese flavor and the spray dried powder was mixed in the composition of Example 6 to produce an intense cheese flavored oil.

EXAMPLE 9

The procedure of Example 8 was repeated with the organisms noted therein, except that instead of continuously flushing the head space of the fermenter with sterilized air, after an initial stirring period of 30 minutes, the flush was discontinued and the fermenter was capped and allowed to remain in the capped condition for 2 days. Thereafter, the growth product was sterilized and subsequently spray dried to produce a cheese flavored powder. This example illustrates the use of microaerophilic conditions for obtaining the growth of the organisms and the growth products produced thereby.

While the cheese flavor produced according to the present invention, and especially when mixed with the growth product of co-pending application Ser. No. 824,250 produces a cheese background flavor entirely satisfactory for most applications, a full cheese flavor may be provided by incorporating the growth product of the present invention into a composition which contains natural cheese, or alternately the combination of the present growth product and the growth product of the said copending application may be incorporated into a composition containing natural cheese. The resulting composition has a very sharp and distinct natural cheese flavor, although minor proportions of the natural cheddar cheese may be used. Hence, proportions of natural cheese may be as low as 3% by weight of the total composition and yet a very distinctive and sharp natural cheese flavor will result. This is especially true when the product of the present invention, or alternately the combination of the product of the present invention and that of the said co-pending application, constitutes at least 10% by weight of the composition and the natural cheese constitutes at least 10% by weight of the composition. The remaining portions of the composition may be as desired, including vegetable oils and fats, animal fats, milk solids, whey solids or any other desired edible base. Of course, conventional dispersing agents and emulsifiers may be used in such compositions, along with conventional coloring agents, preservatives and salt.

Accordingly, the present fermentation composition, or combined with the fermentation composition of said copending application, may be used in combination with any natural cheese, such as cheddar, bleu, brie, brick, camembert, Italian, Romano, Swiss, Roquefort, Cheshire, Gouda, Goya, Parmesan, Provolone, Neufchatel, Mozzarella, Liederkranz and Monterey, among others. Generally, proportions of the growth product of this invention, or combined with the growth products of said application to the natural cheese will vary between 3:100 to 100:3, on a solids weight basis, respectively.

What is claimed is:

1. A pasteurized cheese flavor composition comprising a pasteurized fluid medium containing at least one protein and at least one carbohydrate therein, and said medium containing the growth products of a combination of organisms consisting essentially of at least 10 organisms per gram of the medium of at least one non-toxic lactic acid producing member of the genus streptococcus and at least 10 organisms per gram of the medium of at least one non-toxic member of the genus acetobacter.

2. The composition of claim 1 in a dried form.

3. The composition of claim 1 in a concentrated form.

4. The composition of claim 1 wherein the Acetobacter organisms has been trained to grow on a milk or milk-like medium.

5. The composition of claim 1 wherein the Acetobacter organism is *Acetobacter aceti* and the Streptococcus organism is *Streptococcus lactics.*

6. The composition of claim 1 admixed with natural cheese.

7. The composition of claim 1 wherein the fluid medium is at least in part a milk product.

8. The composition of claim 7 wherein the milk product is selected from whole milk, skim milk, and milk solids.

9. The composition of claim 1 admixed with a cheese flavor composition comprising a pasteurized aqueous medium containing at least one protein and at least one carbohydrate therein, and said medium containing the growth products of a combination of organisms consisting essentially of at least 10 organisms per gram of the medium of at least one non-toxic member of the genus Bacillus and at least 10 organisms per gram of the medium of at least one non-toxic member of the genus Streptococcus.

10. The composition of claim 9 wherein the Bacillus is both *Bacillus megaterium* and *Bacillus megatherium* and the nontoxic Streptococcus of the *Bacillus/Streptococcus* combination is both *Streptococcus lactis*-var. *diacetilactis* (citrate fermenter) and *Streptococcus lactis*-var. *diacetilactis* (citrate non-fermenter).

11. The composition of claim 9 wherein the member of the genus Bacillus is selected from the group consisting of *Bacillus alvei*, Cereus,*cereus* var. *mycoides,* megaterium, megatherium, subtilis, subtilis var. aterrimus and subtilis var. niger.

12. The composition of claim 11 wherein the non-toxic Streptococcus of the *Bacillus/Streptococcus* combination is selected from the group consisting of *Streptococcus cremoris,* durans, faecalis and lactis.

13. The composition of claim 9 wherein the said non-toxic member of the genus Streptococcus of the *Bacillus/Streptococcus* is a lactic acid producing combination member.

14. The composition of claim 13 wherein the said non-toxic Streptococcus *of the* Bacillus/Streptococcus combination and the lactic acid producing Streptococcus of the *Streptococcus/Acetobacter* combination are the same lactic acid producing Streptococcus.

15. A process for producing a cheese flavor comprising pasteurizing a fluid medium containing a protein and a carbohydrate, inoculating the pasteurized fluid medium with a combination of organisms consisting essentially of at least 10 organisms per gram of medium of at least one non-toxic lactic acid producing member of the genus Streptococcus and at least 10 organisms per gram of the medium of at least one non-toxic member of the genus Acetobacter and growing the organisms for a time sufficient to produce a cheese flavor and pasteurizing the medium.

16. The process according to claim 15 wherein the medium is pasteurized after the cheese flavor develops.

17. The process of claim 15 wherein the Acetobacter organisms has been trained to grow in a milk or milk-like medium.

18. The process of claim 15 wherein the Acetobacter organism is *Acetobacter aceti* and the Streptococcus organism is *Streptococcus lactis.*

19. The process of claim 15 where the growth product is admixed with a natural cheese.

20. A process according to claim 15 wherein the growth product is dried.

21. A process according to claim 20 wherein the growth product is spray dried.

22. The process of claim 15 wherein the growth is continued for up to five days.

23. The process of claim 22 wherein the growth is continued for about two to five days.

24. The process of claim 15 wherein the growth of the organisms is at a temperature of between 55° and 130° F.

25. The process of claim 24 wherein the temperature range is 85° F. to 110° F.

26. The process of claim 15 wherein the organisms are grown under microaerophilic to aerobic conditions.

27. The process of claim 26 wherein the part of the growth is carried out in a closed container and the head space of the container is flushed with air.

28. A process according to claim 15 wherein the growth period is for at least 5 hours and the temperature during the growth period is between 60° and 130° F.

29. The process of claim 28 wherein the said medium is inoculated with the said organisms in a proportion of Acetobacter to lactic acid producing Streptococcus of 20:80 to 80:20, respectively.

30. A process according to claim 28 wherein the growth period is continued for at least 15 hours.

31. A process according to claim 15 wherein the growth product is mixed with a cheese flavor composition comprising a pasteurized aqueous medium containing at least one protein and at least one carbohydrate therein, and said medium containing the growth products of a combination of organisms consisting essentially of at least 10 organisms per gram of the medium of at least one non-toxic member of the genus Bacillus and at least 10 organisms per gram of the medium of at least one non-toxic member of the genus Streptococcus.

32. The process of claim 31 wherein the said member of the genus Bacillus is both *Bacillus megaterium* and *Bacillus megatherium* and the said member of the genus Streptococcus is both *Streptococcus lactis* var. *diacetilactis* (citrate fermenter) and *Streptococcus lactis* var. *diacetilactis* (citrate non-fermenter).

33. The pocess of claim 31 wherein the mixed composition is dried.

34. The process of claim 33 wherein the mixed composition is spray dried.

35. The process according to claim 15 wherein the Acetobacter organism is grown in combination with at least one non-toxic member of the genus Bacillus and at least one non-toxic member of the genus Streptococcus.

36. The process according to claim 35 wherein the Streptococcus is a lactic acid producing Streptococcus.

37. The process of claim 35 wherein the organisms are grown at temperatures between 85° F. and 110° F.

38. The process of claim 35 wherein the said Bacillus/Streptococcus organisms are grown in the medium first and then the said Acetobacter/Streptococcus organisms are then grown in the medium.

39. The process of claim 38 wherein the medium is pasteurized after growth of the Bacillus/Streptococcus organisms and before the addition of the Acetobacter/Streptococcus organism.

40. The process of claim 35 wherein the Bacillus/Streptococcus and Acetobacter/Streptococcus organisms are grown in the medium at the same time.

41. The process of claim 40 wherein the Streptococcus organisms of both the Bacillus/Streptococcus and Acetobacter/Streptococcus combinations are the same lactic acid producing Streptococcus organisms.

References Cited

UNITED STATES PATENTS

| | | | |
|---|---|---|---|
| 3,483,087 | 12/1969 | Christensen | 99—116 X |
| 3,535,121 | 10/1970 | Luksas | 99—116 |
| 3,689,286 | 9/1972 | Luksas | 99—140 R |

OTHER REFERENCES

Chemical Abstracts, 73:74212z (1970).

JOSEPH SCOVRONEK, Primary Examiner

S. MARANTZ, Assistant Examiner

U.S. Cl. X.R.

99—115, 116; 195—96